United States Patent [19]

Al-Zamil

[11] Patent Number: 5,550,766
[45] Date of Patent: Aug. 27, 1996

[54] HIGH SPEED DIGITAL POLARITY CORRELATOR

[76] Inventor: Salah A. M. Al-Zamil, King Abdulaziz City for Science and Technology, P.O. Box 6086, Riyadh 11442, Saudi Arabia

[21] Appl. No.: 322,302

[22] Filed: Oct. 4, 1994

[51] Int. Cl.⁶ .................................................. G06F 17/15
[52] U.S. Cl. ........................................... 364/728.03
[58] Field of Search ..................... 364/715.01, 715.11, 364/724.11, 728.03, 728.07

[56] References Cited

U.S. PATENT DOCUMENTS

| | | | |
|---|---|---|---|
| 3,488,635 | 1/1970 | Sifferlen | 364/728.03 X |
| 3,950,635 | 4/1976 | Constant | 364/724.11 |
| 4,032,885 | 6/1977 | Roth | 364/715.11 |
| 4,121,297 | 10/1978 | Smith | 364/728.03 |
| 4,312,074 | 1/1982 | Pautler et al. | 364/715.11 X |
| 5,239,497 | 8/1993 | McKay et al. | 364/728.03 |
| 5,349,550 | 9/1994 | Gage | 364/728.03 |

FOREIGN PATENT DOCUMENTS 2023316  12/1979  United Kingdom .

OTHER PUBLICATIONS

"Random Data: Analysis and Measurement Procedures" by J. S. Bendat and A. Piersol, J. Wiley & Sons, 1971.
"A low-cost software correlator based on a new polarity correlation algorithm" by M.I.A. Harba and S.M. Said, Trans Inst. MC vol. 11, No. 2, Apr.–Jun. 1989.
"Electrical Engineering, A Very High Bandwidth Data Capture Interface for Microprocessor-Based Polarity Data" by A. M. Alsuwailem, J. King Saud Univ. vol. 4, Eng. Sci. (1), pp. 1–12 (1412 A.H./1992).

*Primary Examiner*—Roy N. Envall, Jr.
*Assistant Examiner*—Chuong D. Ngo
*Attorney, Agent, or Firm*—Larson and Taylor

[57] ABSTRACT

A high speed digital polarity correlator includes a shift-one-bit circuit for receiving a first array, shifting the first array, and providing a one-bit shifted array, and a correlation circuit for delivering the correlation coefficient between a second and the one-bit shifted array. The correlation circuit includes an exclusive OR circuit receiving a data byte from each of the two arrays and delivering an XOR output containing a number of same states equal to the number of time the two arrays are in agreement. The conversion unit receives the XOR output and delivers a binary representation of a number of times the two arrays have been in agreement. An adder receives the number, adds the number to an existing sum of previous agreements between the two arrays and delivers an updated sum. A latch receives the updated sum, provides the updated sum as the existing sum to the adder, and, after all data bytes in the two arrays have been examined, delivers the correlation coefficient.

4 Claims, 4 Drawing Sheets

HIGH SPEED DIGITAL POLARITY CORRELATOR

FIELD OF THE INVENTION

The present invention relates to a high speed digital correlator for estimating the average time delay between two random signals.

BACKGROUND OF THE INVENTION

Statisticians have long used cross-correlation to estimate the cause and effect relations in sets of population data. Also, engineering applications of cross-correlation have increased in the past few decades, most likely due to the availability of computers to produce cross-correlation results in real time.

Examples of these engineering applications include: recovery of information in weak radar echoes, identifying the dynamics of chemical processes, spectral analysis, analysis of electrophysical signals, structural fatigue analysis, and flow measurement.

As an example of the application of cross-correlation to flow measurement, a cross-correlation flow meter is shown in FIG. 1. Sensing transducers 110, 115 are spaced apart in the direction of flow. Sensing transducers 110, 115 detect fluid disturbances which are presumed to sustain their identity between these sensors and induce similar signals at each transducer. The two signals from sensing transducers 110, 115 are sampled by analog-to-digital converters 120, 125 respectively, and then sent to the cross-correlator 130.

Cross-correlator 130 samples the digital signals, shifts one signal relative to the other, one bit at a time, multiplies the signal and the shifted signal together, and takes the average of the result. The cross-correlation will reach a maximum when the two signals are identical, since the cross-correlator effectively multiplies the signal by itself. The location of the maximum identifies the time delay or flow movement from the upstream sensing transducer 110 to the downstream sensing transducer 115 for velocity calculation. Since the distance d between the sensing transducers 110, 115 is known, the average velocity can be found by dividing the distance by the time for the maximum correlation.

Another correlation technique, polarity correlation, involves sampling data over a short period of time. The signals can be represented as a string of "1"s for positive values and "0"s for negative values. A more efficient form of coding is to record the instant at which the signal changes from zero to one or vice versa, i.e., points of zero crossing. This allows the number of data items to be independent of the sampling rates, although the effect of missing one of the zero crossing points can be disastrous.

For cross-correlation using the zero crossing polarity, two blocks of data representing the upstream and the downstream zero crossing time intervals are needed. One signal is time shifted with respect to the other. Sometimes the signals are in agreement, i.e., both positive or both negative, and sometimes in disagreement, i.e., one positive, the other negative. The net agreement divided by the total observation period is the polarity cross-correlation. The difference between the current and previous transition is either added to or subtracted from the accumulated value, depending on whether the signals are in agreement or disagreement. This processing continues until all of the zero crossings have been searched.

The zero crossing correlator is perhaps the fastest software correlator available, but the microprocessor based polarity cross-correlator is more economical in terms of signal storage, faster execution time, and a higher operational bandwidth. However, the computational speed of the processing phase of the microprocessor based polarity cross-correlator is still not fast compared with the speed of data capture.

SUMMARY OF THE INVENTION

It is an object of the present invention to provide a correlator having an increased computational speed in order to allow the correlator to be used for real time measurement applications. The computational efficiency of the correlator of the present invention is achieved by implementing the cross-correlation algorithm using a digital logic circuit.

In order to achieve this and other objects, the apparatus of the present invention for correlating two arrays includes a shift-on-bit circuit for receiving a first of the two arrays and providing a one-bit shifted array, and a correlation circuit receiving data from the one-bit shifted array and the second of the two arrays and delivering the correlation coefficient. The correlation circuit includes an exclusive OR circuit receiving a data byte from each of the two arrays and delivering an XOR output containing a number of same states equal to the number of time the two arrays are in agreement. The conversion unit receives the XOR output and delivers a binary representation of the number of times the two arrays have been in agreement. An adder receives the number, adds the number to an existing sum of previous agreements between the two arrays and outputs an updated sum. A latch receives the updated sum, provides the updated sum as the existing sum to the adder, and, after all data bytes in the two arrays have been examined, outputs the correlation coefficient.

The correlator preferably further includes a controller for transferring operation between said shift-one-bit circuit and said correlation circuit. This controller may include a first D-type flip-flop for receiving a one shot signal from the shift-one-bit circuit, a second D-type flip-flop for receiving a one shot signal from the correlation circuit, a third D-type flip-flop for receiving an output from the second D-type flip-flop, a JK-type flip-flop for receiving outputs from the first and third D-type flip-flops, a fourth D-type flip-flop for receiving an output of the JK-type flip-flop and starting operation in the correlation circuit when a one shot signal is received from the shift-one-bit circuit, and a fifth D-type flip-flop for receiving an output of the JK-type flip-flop and starting operation in the shift-one-bit circuit when a one shot signal is received from the correlation circuit.

The look-up table of the present invention advantageously includes a decoder for converting the XOR output into a decimal representation of the number of zeroes in the exclusive OR output, an inverting circuit for receiving an output from a highest of the decimal representations and delivering a most significant bit of the binary representation of the number, and a plurality of NAND circuits each comprising a NAND gate in series with an invertor, for receiving said decimal representations and delivering a binary representation of the number other than the most significant bit.

Other objects, features and advantages of the invention will be set forth in or apparent from the following description of the preferred embodiments of the invention.

BRIEF DESCRIPTION OF THE DRAWINGS

The invention will be described below in further detail with reference to the accompanying drawings wherein:

FIG. 5b is a schematic diagram of the decoder of FIG. 5a; and

DETAILED DESCRIPTION OF THE PREFERRED EMBODIMENTS

Figure 1:
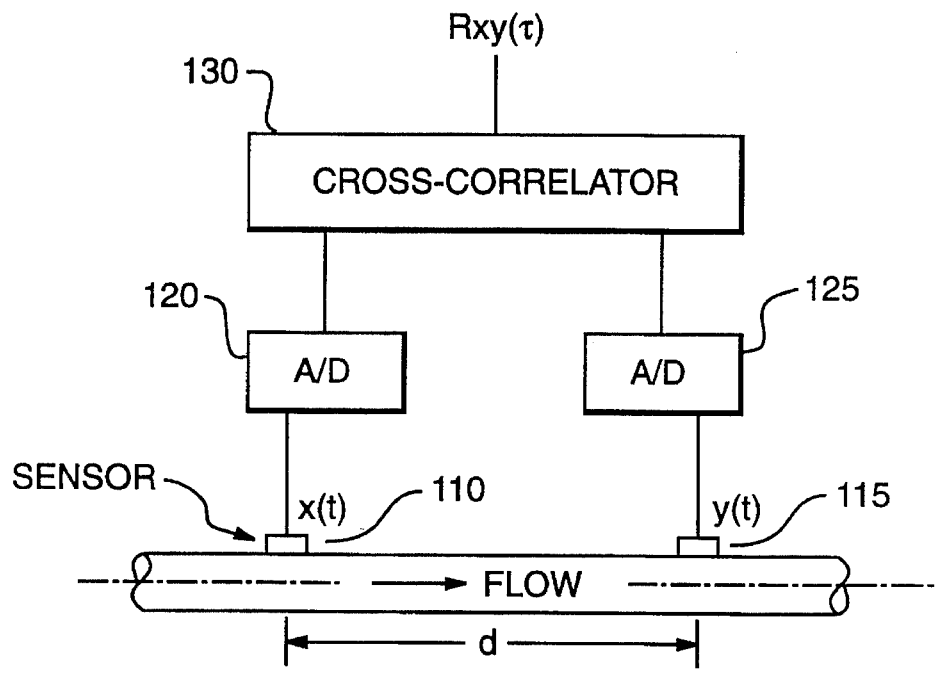
FIG. 1 is an exemplary environment in which the correlator of the present invention may be used.
Figure 2:
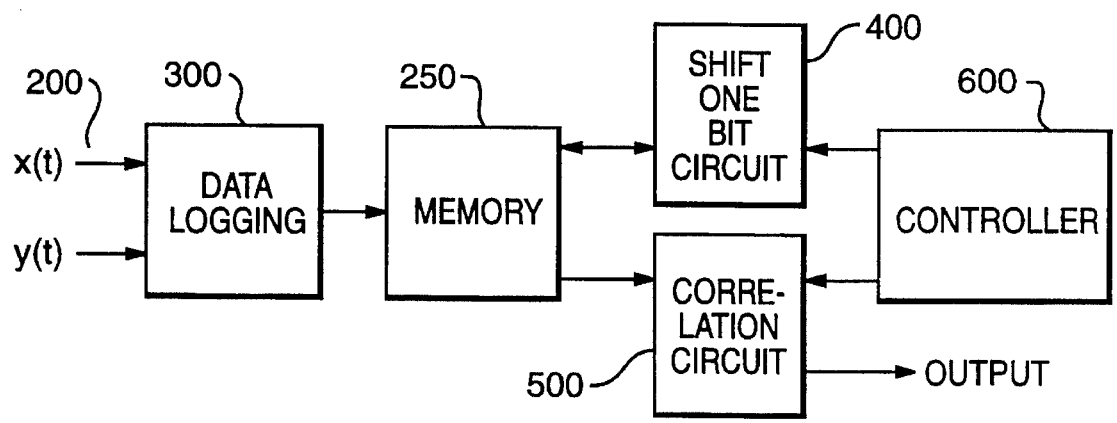
FIG. 2 is a block diagram of a digital correlator of the present invention.

FIG. 2 shows a block diagram of the correlator 200 of the present invention. Correlator 200 consists of five main sections: the data logging section 300, the shift-one-bit circuit 400, the correlation circuit 500, the memory 250 and controller 600. Memory 250 includes two random access memories (RAMs) 430, 530 to be used in storing the two input signals. The circuits will be described in more detail below.

Figure 3:
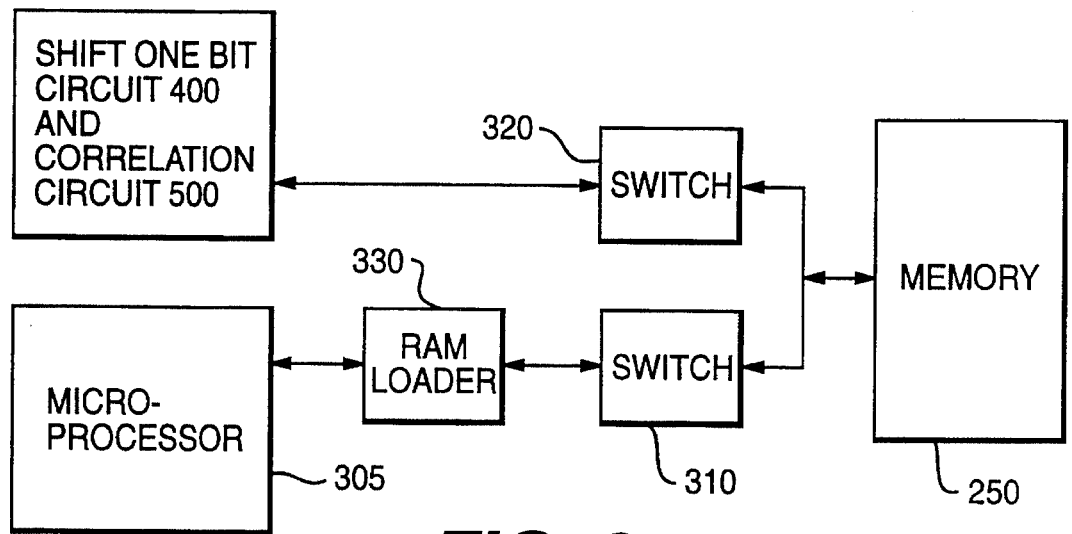
FIG. 3 is a block diagram of the connection between the correlation and shift-one-bit circuits, the microprocessor and the memory of the present invention.

FIG. 3 shows the arrangement of connecting the two RAMs 430, 530 between the shift-one-bit circuit 400 and the correlator circuit 500, and the microprocessor 305. Data logging circuit 300 includes microprocessor 305 and the RAM loader circuit 330. RAM loader circuit 330 transfers data between the memory of microprocessor 305 and RAMs 430, 530 of memory 250. When switch 310 is ON and switch 320 is OFF, microprocessor 305 can access RAMs 430, 530 in memory 250. When switch 310 is OFF and switch 320 is ON, shift-one-bit circuit 400 and correlation circuit 500 access the two RAMs 430, 530 in memory 250 freely.

Figure 4:
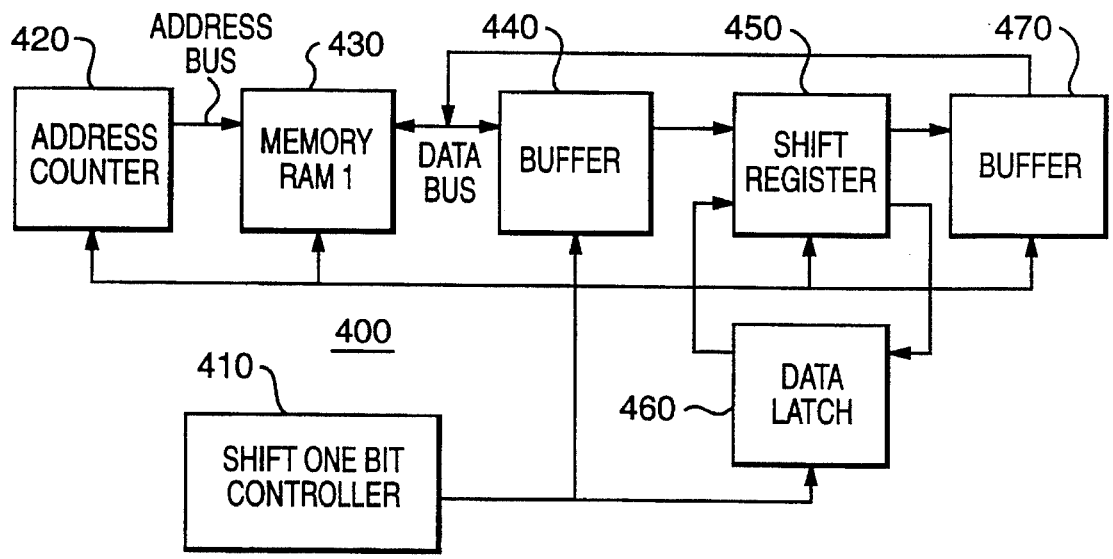
FIG. 4 is a block diagram of a shift-one-bit circuit of the present invention.

The shift-one-bit circuit 400, shown in FIG. 4, performs a shift-one-bit operation for all bytes of one of the two arrays x(t) and y(t). The shift-one-bit controller 410 controls the following operations: generate an address from address counter 420, read a byte from the memory 430, open a first buffer 440, write the byte on a shift register 450 then shift this byte by one bit through the data latch 460, open a second buffer 470, and write the shifted byte on memory 430. These operations are repeated sixteen times, after which the contents of memory 430 are shifted by one bit and ready to be correlated with the contents of another RAM 530 in memory 250.

Figure 5A:
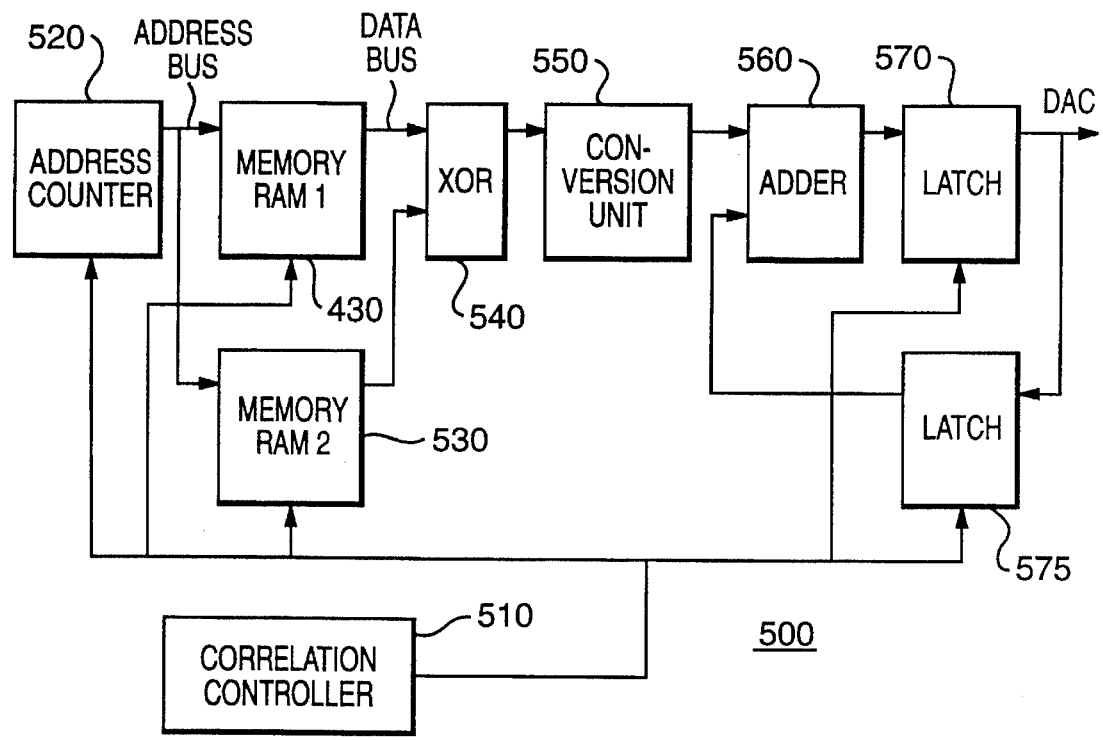
FIG. 5a is a block diagram of a correlation circuit of the present invention.

Correlation circuit 500 is shown in FIG. 5a. The correlation controller 510 controls the operation of the correlation circuit 500. The address counter 520 generates an address for both memories 430, 530. The two data bytes from the two memories 430, 530 are sent to the XOR circuit 540. Since the digital form for estimating the cross-correlation coefficients is given by:

$$R_{xy}(0) = \sum_{i=1}^{N} x(iT)y(iT)$$
$$= \sum_{i=1}^{8} x(iT)y(iT) + \sum_{i=9}^{16} x(iT)y(iT) + \ldots + \sum_{i=N-7}^{N} x(iT)y(iT)$$

where T is the sampling interval and N is the number of samples, each term on the right hand side of this equation may be found by XORing N samples of the x signal with N samples of the y signal. The number of zeroes from XOR circuit 540 indicates the agreement between the two signals. The output of XOR circuit 540 is provided to the conversion unit 550.

In one embodiment, the conversion unit includes a look-up table in memory consisting of $2^N$ locations which has been previously constructed. Typically N=8 or 4, thus each location is addressable by a single byte address. The XOR output from the XOR circuit 540, containing, for this example, four XORs, is used as an address for the look-up table. The locations in the look-up table are loaded each with the number of zeroes in the byte used for its own address. When the byte at the output of the XORing operation is used as an address to the look-up table, then the contents of the addressed location immediately gives the required number of zeroes, and no testing of individual bits is required.

At this address, the number of zeroes in the address is stored as the sum of zeroes, i.e., address 0000 would store the sum 0100 (4), address 0001 would store the sum 0011 (3), address 0010 would store the sum 0011 (3), address 0011 would store the sum 0010 (2) . . . , and addresses 1111 would store the sum 0000 (0). This allows the addressed location to immediately deliver the number of zeroes.

Figure 5B:
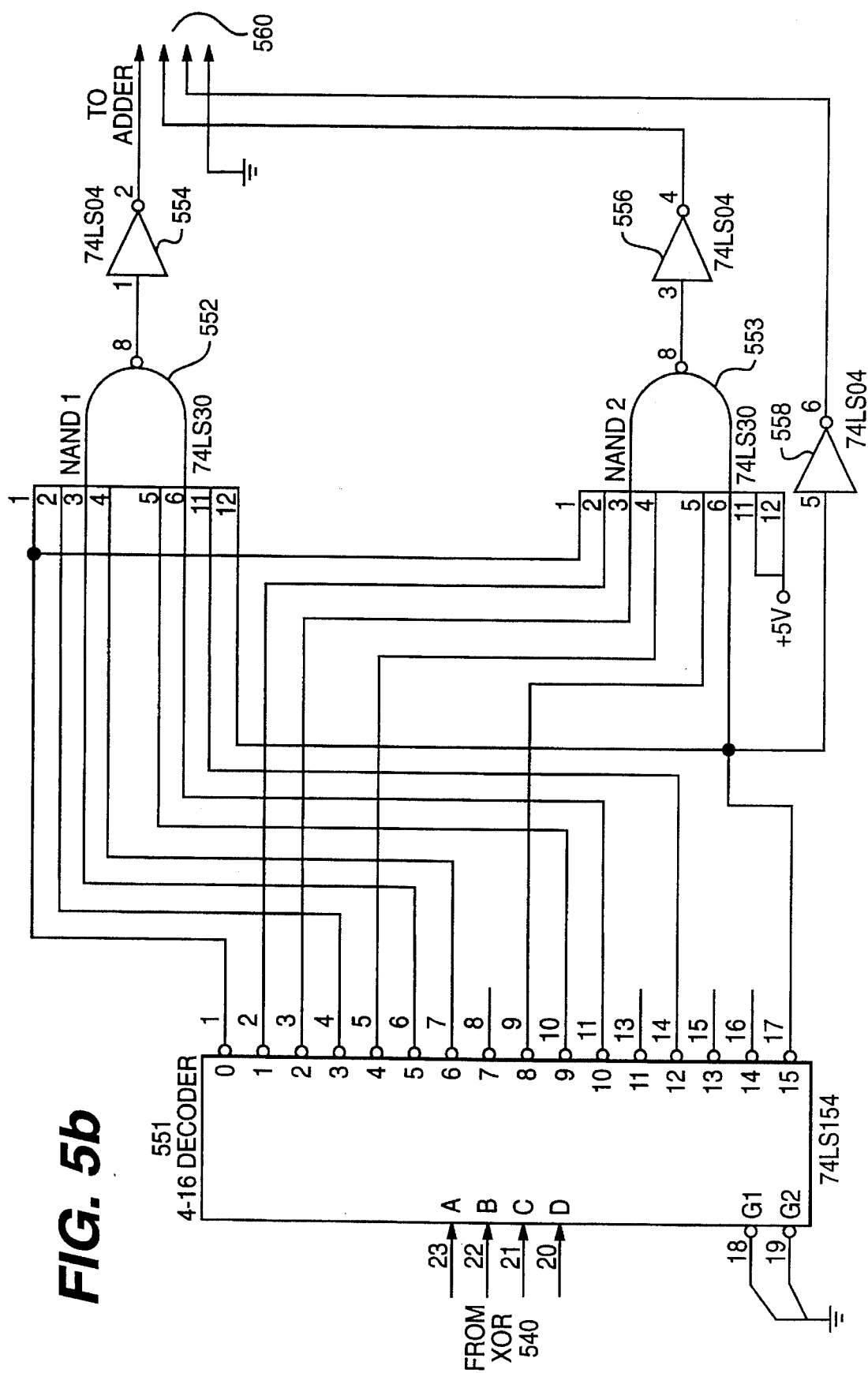

As an alternative to using a look-up table preconstructed in memory, conversion unit 550 may be constructed as a digital logic circuit shown in FIG. 5b. In FIG. 5b, 4–16 decoder 551 receives the outputs from XOR circuit 540 and converts these outputs into their decimal representation, in accordance with the location of zeroes provided by the outputs. The NAND gates 552, 553 output the logical combination of the converted values from decoder 551. Since the maximum number of zeroes output from XOR circuit 540 is four, only three bits are of interest, and invertors 554, 556 and 558 deliver these three bits to the adder 560, with invertor 558 delivering the most significant bit.

The number of zeroes is then sent from conversion unit 550 to adder 560 to accumulate with the previous sum of zeroes saved in the latch 575. In the initial stage, the number transferred from latch 575 to adder 560 is zero. The result of addition output from adder 560 is transferred to the latch 570. Latch 570 outputs this result to update latch 575.

These operations are repeated for the sixteen bytes stored in RAMs 430, 530, after which the correlation coefficient is ready to be sent from latch 570 to be converted to analog form by a digital-to-analog converter.

Figure 6:
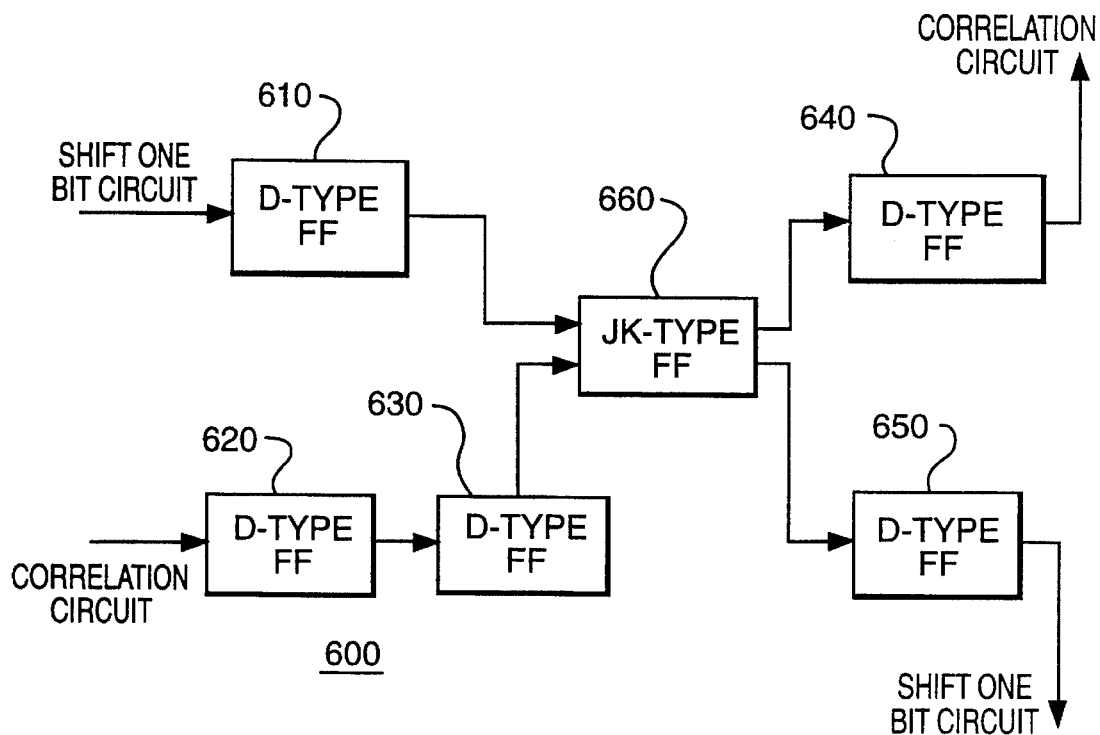
FIG. 6 is a block diagram of a main controller circuit of the present invention.

The main controller 600, shown in FIG. 6, is used to alternate the operation between the shift-one-bit circuit 400 and the correlation circuit 500. After producing each correlation coefficient, main controller 600 transfers the operation to the shift-one-bit circuit 400 to shift the contents of memory 430 by one bit and then, after shifting is complete, transfers the operation back to the correlation circuit 500.

Main controller 600 includes five D-type flip-flop circuits 610, 620, 630, 640, 650 and one JK-type flip-flop circuit 660. A one shot signal is sent from the shift-one-bit circuit 400 and the correlation circuit 500 when the address counters 420, 520 respectively reaches the end count. D-type flip-flop 610 and JK-type flip flop 660 delay the one shot signal coming from shift-one-bit circuit 400 by two clock cycles. D-type flip-flops 620, 630 and JK-type flip flop 660 delay the one shot signal coming from correlation circuit 500 by three clock cycles in order to allow the digital-to-analog converter to convert the correlation coefficient before main controller 600 transfers to shift-one-bit circuit 400. The outputs of d-type flip flops 640 and 650 have opposite states. When the one shot signal comes from one of the two circuits, indicating that the operations of this circuit is finished, the other circuit will start its operations while the first circuit is off.

The digital correlator of the present invention, in conjunction with block sampling, is low in cost and high in computational speed and operational bandwidth, and can handle the speed of data capturing in engineering applications. About 87.43 ms is needed to estimate 128 correlation coefficients using a 3.31 MHz master clock and about 29 ms is needed to estimate 128 correlation coefficients when 10 MHz master clock is used, i.e., is sixty-four times faster than previous versions.

The implementation set forth herein uses a 4-bit memory word for the sake of simplicity of explanation. Clearly the conversion of this system for use with an 8-bit memory word is easily accomplished by replacing the existing components with their 8 bit counterparts or duplicating the components.

Although the present invention has been described above relative to exemplary preferred embodiments thereof, it will be understood by those skilled in the art that variations and modifications can be effected in these embodiments without departing from the scope and spirit of the invention as defined in the claims which follow.

What is claimed is:

1. An apparatus for correlating two arrays comprising:

a shift-one-bit circuit for receiving a first of said two arrays, for shifting said first of said two arrays, and for providing a one-bit shifted array;

a correlation circuit including an exclusive OR circuit for receiving a data byte from a second of said two arrays and said one-bit shifted array, and for delivering an XOR output containing a number of same states equal to the number of times said two arrays are in agreement;

a conversion means for receiving said XOR output and for delivering a binary representation of said number of times said two arrays have been in agreement;

an adder for receiving said number, for adding said number to an existing sum of previous agreements between said two arrays and for delivering an updated sum; and a latch for receiving said updated sum, for providing said updated sum as said existing sum to said adder, and for, after all data bytes in said two arrays have been examined, delivering a correlation coefficient; and a controller for transferring operation between said shift-one-bit circuit and said correlation circuit; said controller comprising a combination of flip-flops for alternately receiving a one shot signal from said shift-one-bit circuit and a one shot signal from siad correlation circuit, for starting operation in said correlation circuit when said one shot signal is received from said shift-one-bit circuit, and for starting operation in said shift-one-bit circuit when said one shot signal is received from said correlation circuit, said combination of flip-flops comprising: a first D-type flip-flop for receiving said one shot signal from said shift-one-bit circuit; a second D-type flip-flop for receiving said one shot signal from said correlation circuit; a third D-type flip-flop for receiving an output from said second D-type flip-flop; a JK-type flip-flop for receiving outputs from said first and third D-type flip flops; a fourth D-type flip-flop for receiving an output of said JK-type flip-flop and starting operation in said correlation circuit when said one shot signal is received from said shift-one-bit circuit; and a fifth D-type flip-flop for receiving an output of said JK-type flip-flop and starting operation in said shift-one-bit circuit when said one shot signal is received from said correlation circuit.

2. The apparatus as recited in claim 1, further comprising a memory for storing said two arrays, means for switching access to said memory between a loading circuit for loading data into said two arrays and said shift-one-bit circuit and said correlator circuit.

3. An apparatus as recited in claim 1 wherein said conversion means comprises:

a decoder for converting said XOR output into a decimal representation of said number of same states in said XOR output;

an inverting circuit for receiving an output from a highest of said decimal representations and for delivering the most significant bit of the binary representation of said number; and a plurality of NAND circuits, each comprising a NAND gate in series with an invertor, for receiving said decimal representations and for delivering a binary representation of said number other than said most significant bit.

4. An apparatus as recited in claim 1 wherein said conversion means comprises a look-up table in memory and said XOR output is used as an address for said look-up table. between said two arrays and for delivering an updated sum; and a latch for receiving said updated sum, for providing said updated sum as said existing sum to said adder, and for, after all data bytes in said two arrays have been examined, delivering a correlation coefficient; and a controller for transferring operation between said shift-one-bit circuit and said correlation circuit; said controller comprising a combination of flip-flops for alternately receiving a one shot signal from said shift-one-bit circuit and a one shot signal from said correlation circuit, for starting operation in said correlation circuit when said one shot signal is received from said shift-one-bit circuit, and for starting operation in said shift-one-bit circuit when said one shot signal is received from said correlation circuit, said combination of flip-flops comprising: a first D-type flip-flop for receiving said one shot signal from said shift-one-bit circuit; a second D-type flip-flop for receiving said one shot signal from said correlation circuit; a third D-type flip-flop for receiving an output from said second D-type flip-flop; a JK-type flip-flop for receiving outputs from said first and third D-type flip flops; a fourth D-type flip-flop for receiving an output of said JK-type flip-flop and starting operation in said correlation circuit when said one shot signal is received from said shift-one-bit circuit; and a fifth D-type flip-flop for receiving an output of said JK-type flip-flop and starting operation in said shift-one-bit circuit when said one shot signal is received from said correlation circuit.

\* \* \* \* \*